US005926187A

United States Patent [19]

Kim

[11] Patent Number: 5,926,187

[45] Date of Patent: Jul. 20, 1999

[54] VIDEO INTERFACE AND OVERLAY SYSTEM AND PROCESS

[75] Inventor: Hoyoung Kim, San Jose, Calif.

[73] Assignee: Samsung Electronics Co., Ltd., Seoul, Rep. of Korea

[21] Appl. No.: 08/733,905

[22] Filed: Oct. 18, 1996

[51] Int. Cl.[6] .......... G06T 3/00

[52] U.S. Cl. .......... 345/435; 345/433

[58] Field of Search .......... 345/435, 433, 345/434, 436, 438

[56] References Cited

U.S. PATENT DOCUMENTS

| | | | |
|---|---|---|---|
| 5,634,040 | 5/1997 | Her et al. | 345/435 |
| 5,701,184 | 12/1997 | Motoyama | 345/435 |
| 5,706,417 | 1/1998 | Adelson | 345/435 |
| 5,706,419 | 1/1998 | Matsugu et al. | 345/435 |

*Primary Examiner*—Phu K. Nguyen
*Assistant Examiner*—Cliff N. Vo
*Attorney, Agent, or Firm*—Skjerven, Morrill, MacPherson, Franklin & Friel; David T. Millers

[57] ABSTRACT

A video overlay system includes a bus device including a processor, a local memory, a video interface, and a DMA unit. A host computer passes to the processor the locations of one or more video windows in a graphics image, and the processor prepares a video pixel map in local memory which corresponds the size of the graphics image. The video pixel map has video data for one or more video images in the locations of the video window. The remainder of the video pixel map contains dummy values. The DMA unit moves pixel values from the local memory to the video interface, and the video interface provides the pixel values including both video data and dummy values to an encoder in synchronization with pixel values from another source which represent the graphics image. The encoder generates a video signal from pixel values representing the graphics image except when a key value occurs. When the key value occurs, the encoder uses a pixel value from the video interface in place of the key value.

11 Claims, 7 Drawing Sheets

VIDEO INTERFACE AND OVERLAY SYSTEM AND PROCESS

BACKGROUND OF THE INVENTION

1. Field of the Invention

This invention relates to processes and systems for inserting a video image into a graphics image when generating a video signal.

2. Description of Related Art

Conventional computer systems generate pixel maps to represent graphics images. A pixels map is a two dimensional array of pixel values where each pixel value indicates a color for a corresponding pixel (area) on a monitor or other video display. A video encoder generates an output video signal from the pixel values in a pixel map, and a monitor displays the image represented by the video signal. For the image to have the proper appearance, the rows and columns of the pixel map must be synchronized or matched with portions of the output video signal that are associated with the same rows and columns on the monitor so that each pixel is displayed with the color identified by an associated pixel value.

Video overlay systems can insert into a graphics image a video image such as might be generated by a television tuner, a video camera, VCR, or a video decoder. Video overlay systems commonly include software that generates a pixel map representing the graphics image and provides in the graphics image a video window which is filled with a color (or chroma) key. A separate device such as a video capture card generates the video image. In one type of system, an analog video signal represents the video image; and when converting the pixel map representing the graphics image to an output video signal, an overlay system recognizes the chroma key and inserts the analog video signal in place of a signal representing the chroma key. When the graphics signal no longer represents the chroma key, the output signal switches back to the video signal generated for the graphics image. In this type of overlay system, proper synchronization of the inserted video signal in the graphic video signal can be difficult to achieve. An alternative overlay system generates pixel maps representing frames of the video image to be displayed in the video window. The pixel maps for the video image contain rows and columns of pixels matching the area of the video window. When a video encoder encounters in the pixel map for the graphics image a pixel value matching the chroma key, that pixel value is replaced with a pixel value from the pixel map for the video image.

Both of the above overlay systems encounter difficulties when inserting multiple video images into multiple video windows in the graphics image. For multiple video windows, the overlay system must select from among multiple video signals or pixel maps each time a color key is encountered. In particular, the overlay system must match each video window with the video signal or video pixel map corresponding to the video window. Matching windows and video images can be prohibitively complex.

SUMMARY OF THE INVENTION

In accordance with an aspect of the invention, a video overlay system uses two pixel maps of the same size. One pixel map, which is referred to herein as the graphics pixel map, represents a graphics image and contains one or multiple video windows, each of which is filled with a color key. The second pixel map, referred to herein as the video pixel map, contains video data representing one or more video images to be displayed and dummy (or "don't care") data to be discarded. The video data is positioned in the video pixel map at the same locations as chroma key values in the graphics pixel map. A video encoder which generates a video signal for a monitor or other video display uses pixel values from the graphics pixel map unless the pixel value from the graphics pixel map is the chroma key. If the graphics pixel value is equal to the chroma key, the video encoder uses a pixel value which is from the video pixel map and at the same relative position as the graphics pixel value being replaced.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a video overlay system uses two pixel maps of the same size. One pixel map, which is referred to herein as the graphics pixel map, represents a graphics image and contains one or more video windows each of which is filled with a chroma key. The second pixel map, referred to herein as the video pixel map, contains video data representing one or more video images to be displayed and dummy data to be discarded.

In one embodiment, a bus device that is attached to a host computer includes a signal processor which executes software to construct the video pixel map. A host CPU executes driver for the device and indicates the position of the video windows in the graphics image so that the signal processor can position the video data in the video pixel map at the same locations as chroma key values in the graphics pixel map. A video encoder on the device generates a video signal for a monitor or other video display. The video encoder uses pixel values from the graphics pixel map unless a pixel value from the graphics pixel map has the chroma key value. If the graphics pixel value has the chroma key value, the video encoder uses a pixel value which is from the video pixel map and at the same relative position as the graphics pixel value being replaced. Multiple video windows can be handled without difficulty because video data is already correctly positioned in the video pixel map.

Figure 1:
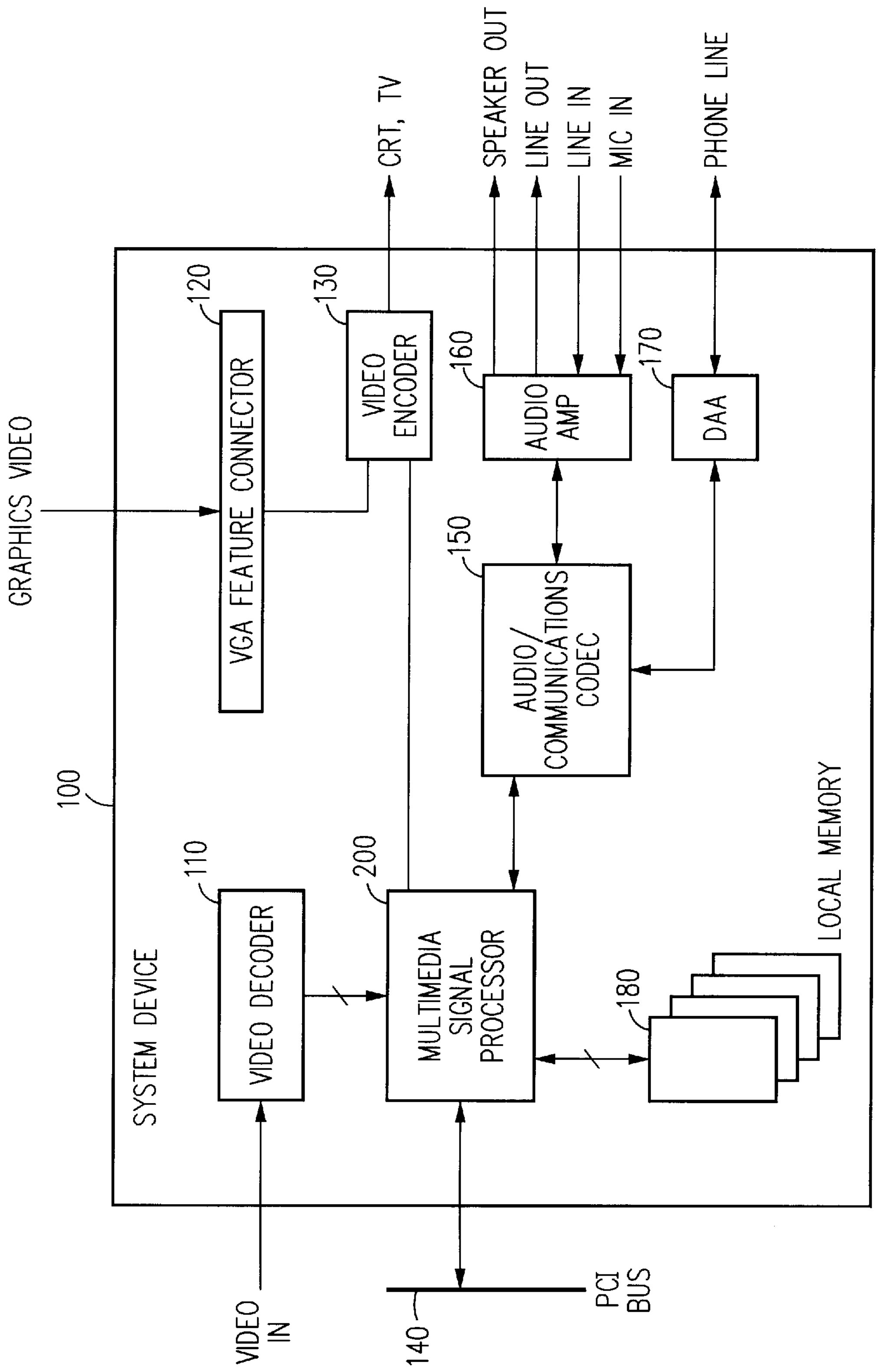
FIG. 1 is a block diagram of a multimedia device which performs a video overlay process in accordance with an embodiment of invention.

FIG. 1 shows an embodiment of a multimedia device 100 capable of implementing a variety of multimedia operations including an overlay process in accordance with an embodiment of the invention. Device 100 connects to a PCI bus 140 of a host computer (not shown) and includes a multimedia signal processor (MSP) 200 and a local memory 180 which stores data and instructions for MSP 200. The host computer and device 100 execute separate programs which co-operate to perform desired multimedia functions. With the appropriate software for MSP 200, device 100 can perform functions including: video capture; digital video to NTSC or PAL signal conversion; JPEG, MPEG I, and MPEG II encoding and decoding; video image overlay into a graphics image; graphics card emulation; FM and wavetable sound synthesis; facsimile and modem communications; sound card emulation; and video conferencing.

For video processing, device 100 includes a video decoder 110 which handles input video signals to be processed by MSP 200 and a video encoder 130 which converts video information to a video signal for a television or a video monitor. A separate video card (not shown) supplies graphics data to video encoder 130 via a feature connector 120. In one embodiment, feature connector 120 follows an industry standard interface implemented by video card manufactures for transferring graphics data from VGA video cards. MSP 200 generates video data, for example, by executing software for JPEG, MPEG I, or MPEG II decoding, by decoding a video signal from a telephone line, or by processing video data from video decoder 110. Video encoder 130 generates an analog video signal for a television, monitor, or other video display by decoding pixel values in an overlay process which can combine video data from MSP 200 and with the graphics data from feature connector 120.

An audio/communications codec 150 which performs analog-to-digital and digital-to-analog conversions creates a bridge between MSP 200 and analog systems such as an audio input/output amplifier 160 and a data access arrangement (DAA) circuit 170. For example, when the host computer sends appropriate data or commands to device 100 via bus 140, MSP 200 executes sound card emulation software which implements sound generation techniques such as FM or wavetable synthesis as requested by the host computer. Execution of the sound card software generates sound samples which codec 150 converts to an analog audio signal.

For communications processing, codec 150 digitizes an analog communication signal derived from a telephone line and passes the digitized signal through MSP 200 to local memory 180. MSP 200 executes modem, facsimile, or videophone software to demodulate, decompress, and otherwise extract data from the digitized signal. For transmission of data on telephone lines, MSP 200 receives data from the host computer and generates a sequence of samples representing an analog signal according to a protocol for conveying the data. Codec 150 converts the samples to an analog signal which is transmitted through DAA circuit 170.

Figure 2:
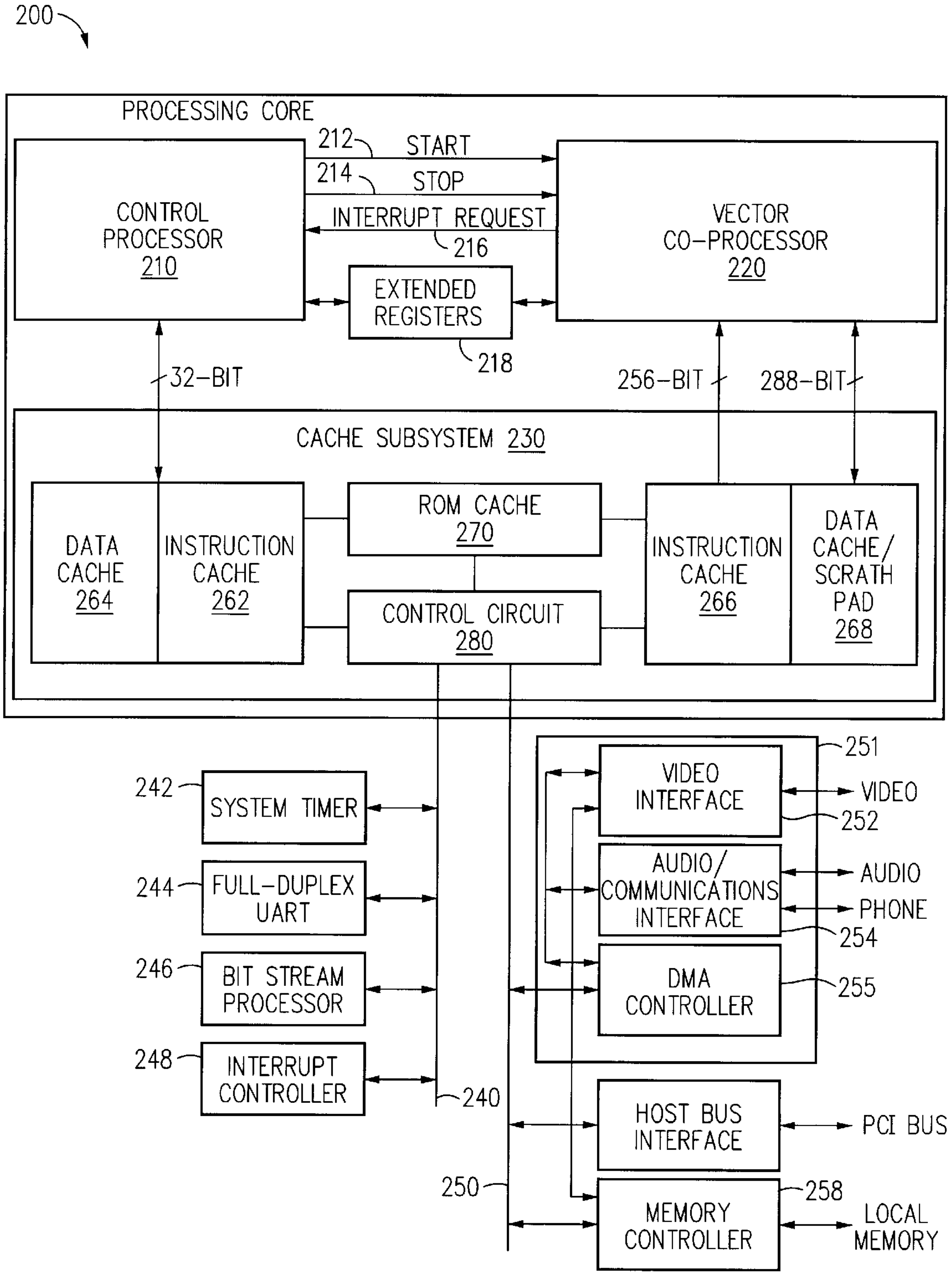
FIG. 2 is a block diagram of a multimedia signal processor for the device of FIG. 1.

FIG. 2 shows a block diagram of the exemplary embodiment of MSP 200. MSP 200 is an integrated multiprocessor which includes a general-purpose processor 210 and a vector processor 220. In an exemplary embodiment of the invention, processor 210 implements the ARM7 architecture and instruction set described in the "ARM7DM Data Sheet", Document Number: ARM DDI 0010G which is available from Advance RISC Machines Ltd.; and vector processor 220 implements the instruction set described in U.S. patent application Ser. No. 08/699,597. Processors 210 and 220 execute separate program threads and are structurally different for more efficient execution of particular tasks. Processor 210 executes a real-time operating system, exception routines for both processors 210 and 220, and general processes not requiring large numbers of repetitive calculations. The real-time operating system allows multitasking for simultaneous execution of software for multiple functions. Processor 210 also controls initialization, starting, and stopping of vector processor 220. Vector processor 220 performs number crunching including repetitive operations on large data blocks that are common in multimedia processing.

Processors 210 and 220 communicate with each other through direct lines 212, 214, and 216 or through shared extended registers 218. Processors 210 and 220 communicate with other on-chip components through a cache subsystem 230 which contains an instruction cache 262 and a data cache 264 for processor 210 and an instruction cache 266 and data cache/scratch pad 268 for vector processor 220. Cache subsystem 230 also includes a ROM cache 270 and control circuitry 280. Cache subsystem 230 acts as a switching station for processor 210, processor 220, and on-chip devices coupled to busses 240 and 250. U.S. patent application Ser. Nos. 08/697,102 and 08/733,813 further describe operation of a cache subsystem 230.

Bus 240 which is sometimes referred to herein as IOBUS 240 connects to on-chip devices such as a system timer 242, a UART (universal asynchronous receiver transceiver) 244, a bitstream processor 246, and an interrupt controller 248.

Bus 250, sometimes referred to herein as FBUS 250, operates at a higher clock frequency than bus 240 and is connected to on-chip devices such as an ASIC interface 251, a host interface 256, and a memory controller 258. Memory controller 258, host interface 256, and ASIC interface 251 respectively provide interfaces for local memory 180, the host computer, and external integrated circuits such as video decoder 110, video encoder 130, and codec 150. ASIC interface 251 includes a video interface 252, an audio/communications interface 254, and a DMA controller 255. Video interface 252 communicate with video decoder 110 and video encoder 130, and an audio/communications interface 254 communicates with codec 150. DMA controller 255 controls DMA (direct memory access) operations between local memory 180 coupled to memory controller 258 and devices coupled to video interface 252 and codec interface 254. DMA operations can proceed without intervention from processor 210 or 220.

Figure 3:
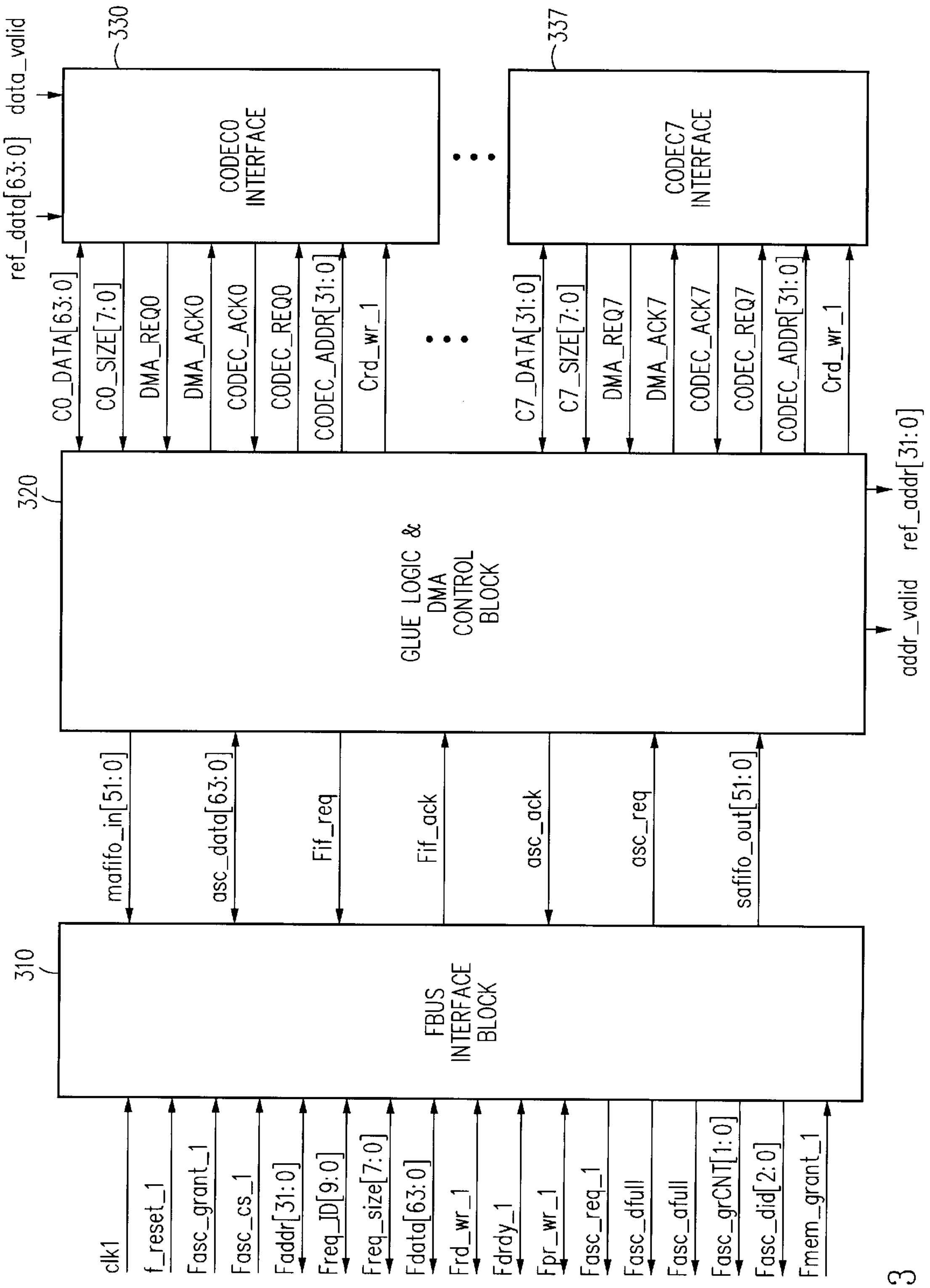
FIG. 3 is a block diagram of an ASIC interface for the multimedia signal processor of FIG. 2.

FIG. 3 illustrates the organization of an embodiment of ASIC interface 251. In this embodiment, DMA controller 255 is illustrated as two blocks an FBUS interface block 310 and a glue logic and DMA control block 320. FBUS interface block 310 implements the protocol necessary to transfer data on FBUS 250. FBUS 250 is a shared bus which is coupled to cache subsystem 230, DMA controller 255, host interface 256, and memory controller 258 as indicated above in regard to FIG. 2. To transfer data via FBUS 250, DMA controller 255 requests access to FBUS 250 with memory controller 258 as a target device. A bus arbiter (not shown) grants access according to current use of FBUS 250 and priority of devices requesting access. The arbiter signals memory controller 258 to be ready when the arbiter grants bus access to DMA controller 255. U.S. patent application Ser. No. 08/731,393 describes a suitable bus protocol for FBUS 250. Table A.3 describes the signals employed by FBUS interface 310. Alternative bus interfaces and protocols for FBUS interface 310 and FBUS 250 are well known in the art.

DMA control block 320 provides eight DMA channels which are assigned to up to eight codec interfaces 330 to 337. Each codec interface 330 to 337 is adapted for a specific type of external device which uses the associated DMA channel. Although referred to herein as codec interfaces, interfaces 330 to 337 can more generally be adapted to external devices not limited to codecs. In the exemplary embodiment, channel 0 and codec interface 330 are for video encoder 130 which is a KS0119 video encoder available from Samsung Electronics Co., Ltd. DMA channel 2 and codec interface 332 are for video decoder 110 which is a KS0122 available from Samsung Electronics Co., Ltd. DMA channels 4, 5, 6, and 7 are for digital-to-analog and analog-to-digital converters in an audio/communications codec 150 which is an AD1843 available from Analog Devices, Inc. Channels 1 and 3 are unused in the exemplary embodiment.

In addition to access via FBUS 250, DMA control block 320 has direct access to memory controller 258 via a bus carrying an address signal ref_addr and a control signal addr_valid. When signal addr_valid is asserted, memory controller 258 queues a priority read operation of the size requested by DMA controller 255. These priority reads are handled before DMA requests via FBUS 250. Memory controller 258 asserts a signal data_valid to codec interface 330 when data is ready and a signal ref_dat indicates a 64-bit value read from local memory 180. Signals ref_addr and ref_dat bypass FBUS 250 to provide a data transfer without competition for access to FBUS 250. U.S. patent application Ser. No. 08/730,915 describes circuitry and a process for memory controller 258 to rapidly transfer video data for screen refresh operations.

Figure 4:
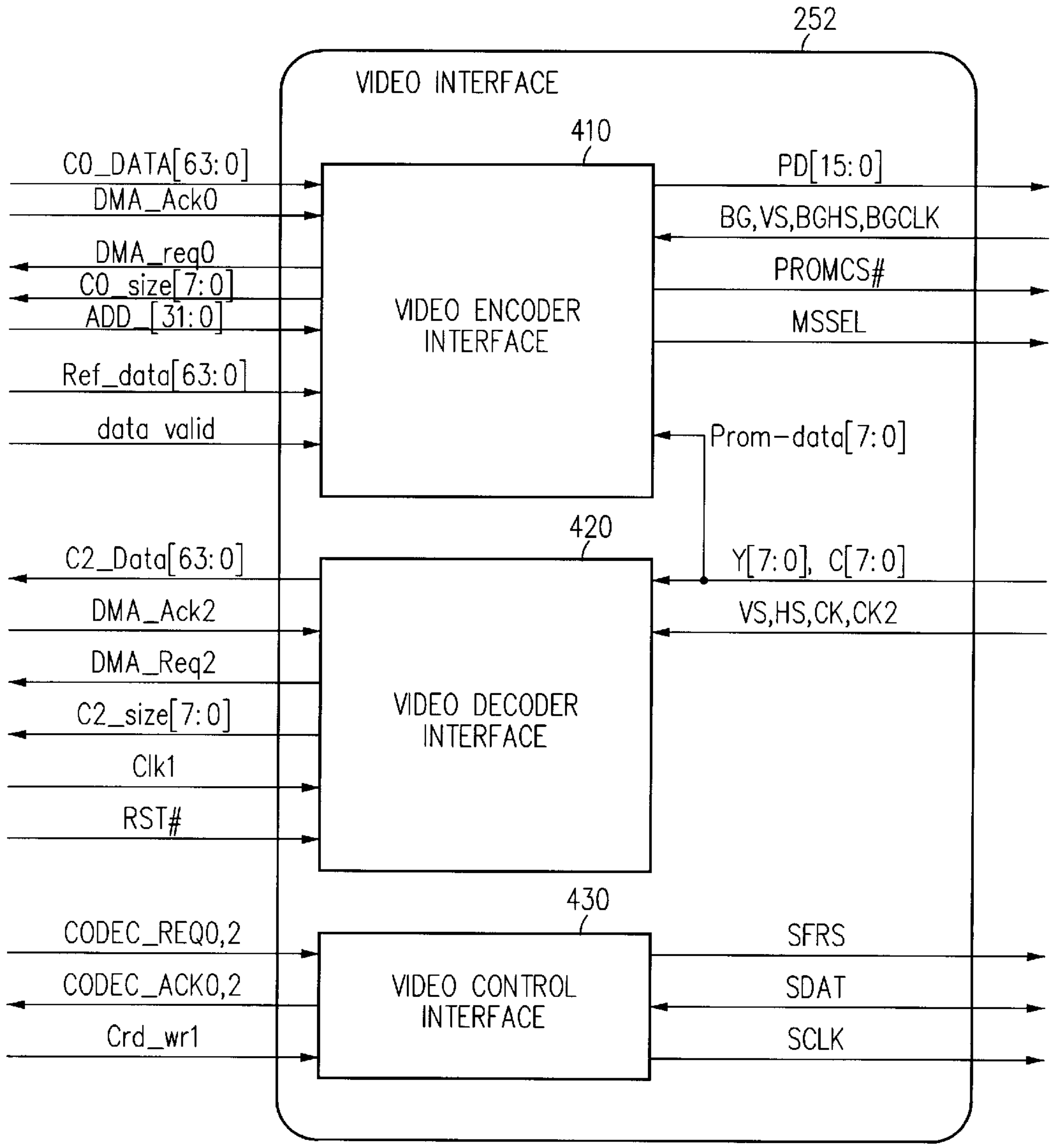
FIG. 4 is a block diagram illustrating the organization of a video interface in accordance with an embodiment of the invention.

FIG. 4 shows a block diagram of video interface 252 which implements the functions of codec interfaces 330 and 332 of FIG. 3. Video interface 252 includes a video encoder interface 410, a video decoder interface 420, and a video control interface 430. Video encoder interface 410 provides a data signal PD[15:0] representing pixel values to video encoder 130. Video interface 410 receives a horizontal synchronization signal BGHS, a vertical synchronization signal BGVS, and a clock signal BGCLK which video encoder 130 uses when decoding pixel values to generate a video signal. A signal MSSEL selects the operating mode of video encoder 130. In a VGA emulation mode, video encoder 130 decodes only pixel values from video interface 410, and MSP 200 executes software to emulate a VGA graphic card. In an overlay mode, video encoder 130 uses graphics data from feature connector 120 and overlays video windows with video data from video interface 410.

Video encoder interface 410 also implements an interface to external ROM (not shown) which stores start-up firmware for processor 200. When a signal PROMCS# is asserted low, signal PD[15:0] indicates an address for the external ROM, and a data signal PROM_DATA[7:0] is returned from the PROM to video interface 410. Processor 210 controls transfer of ROM data via the DMA data bus and FBUS 250 to local SDRAM 180 during initialization.

Video decoder interface 420 receives signals Y[7:0] and C[7:0] representing pixel values from video decoder 110. In one embodiment, signals Y[7:0] and C[7:0] represent pixel values in a 16-bit YCrCb 4:2:2 format, but other pixel value formats could be employed. Video decoder interface 420 also receives a vertical synchronization signal VS, a horizontal synchronization signal HS, and clock signals CK and CK2 which are control signals used in forming pixel maps. A DMA operation stores video data from video decoder 110 in local memory 180 where the data is available to MSP 200. MSP 200 can, for example, uses the video data to generate a pixel map for an overlay operation such as described below.

Video control interface 430 provides an interface for accessing control registers in video encoder 130 and video decoder 110. For a KS0119 or KS0122, the interface is a three-wire serial interface. A signal SCLK controls the rate of data transfer. Signal SFRS indicates a frame sync signal for frames of data transferred according to the protocol defined for the KS0119 encoder.

Figure 5:
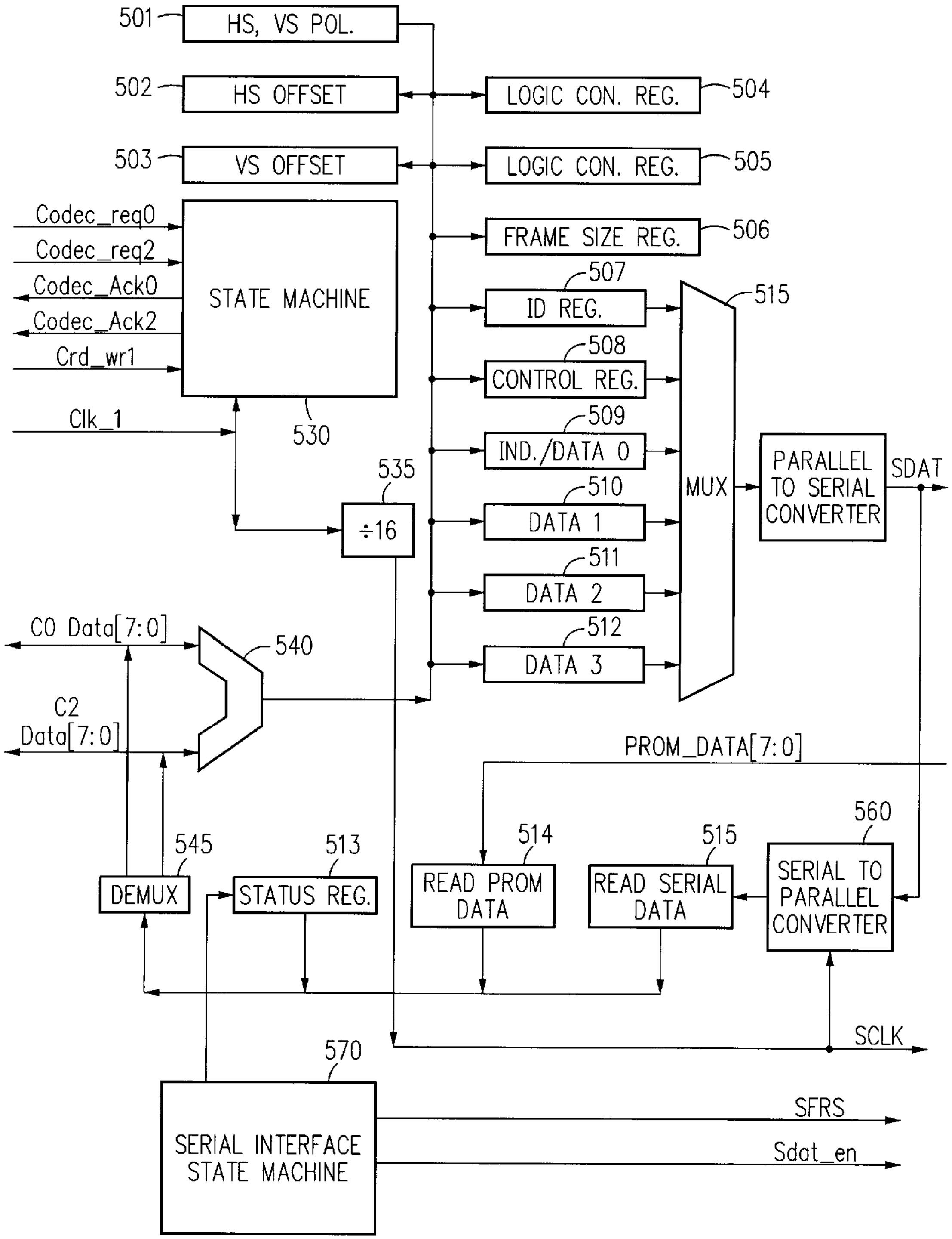
FIG. 5 is block diagram of registers in a video interface and circuitry for accessing registers in a video encoder and a video decoder.

FIG. 5 shows a block diagram of video control interface 430 with the addition of the register set of video interface 452. Data for configuring and reading registers is passed via DMA channel 0 for video encoder 130 and via DMA channel 2 for video decoder 110. Video interface 252 includes registers 501 to 515 which are loaded with values that control operation of video interface 252 and which control access to control registers in video encoder 130 and video decoder 110. Tables A.4 and A.5 list the register set for the exemplary embodiment of video interface 252. Each register has an address in the address space of MSP 200. To write to any of registers 501 to 512, processor 210 addresses data to the address corresponding to the desired register, and cache control system 230 accesses DMA controller 255 via FBUS 250. After handshaking through codec request and acknowledges signals for the appropriate channel, DMA control generates a signal Crd_wrl identifying the register and data signal to be written. A state machine 530 controls a multiplexer 540 which selects the source of input data (C0_data or C2_data) and causes the selected register to store the data. Registers 507 to 512 and a multiplexer 515 implement the protocol for accessing control registers in video encoder 130 and video decoder 110 and are described in the Appendix.

Figure 6:
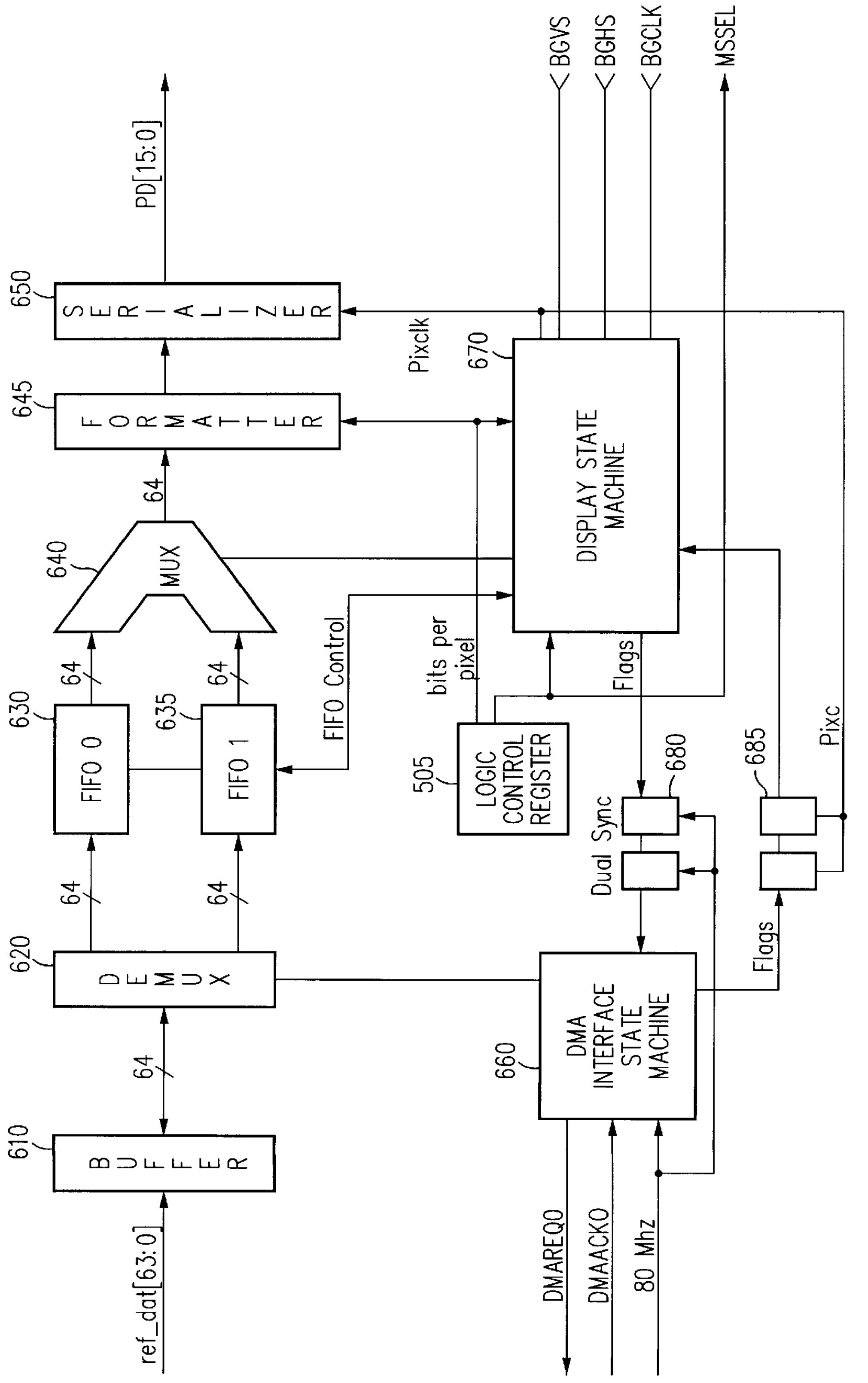
FIG. 6 is a block diagram of a data path through a video interface to a video encoder.

FIG. 6 is a block diagram of the data path through video interface 252 to video encoder 130. Video data is provided to video interface 252 through a direct line carrying 64-bit data signal ref_dat. Using a direct bus to memory controller 258 avoids time delays possible on shared bus 250 and allows fast access to video data for a screen refresh. Data represented by signal ref_dat is initially stored in a buffer 610 before being transferred through a de-multiplexer 620 to a FIFO buffer 630 or a FIFO buffer 635. A display state machine 670 is coupled to FIFO buffers 630 and 635, and when either of the FIFO buffers is empty requests a DMA transfer to the empty buffer while data from the other FIFO buffer is transmitted to video encoder 130. Synchronizers 680 and 685 communicate control signals between display state machine 670 and a DMA state machine 660 which requests the DMA transfer and controls de-multiplexer 620 to route data to the appropriate FIFO buffer 630 or 635.

Display state machine 670 controls a multiplexer 640 which selects FIFO buffer 630 or 635 as the source of video data. Video data is transferred 64 bits at a time via signal ref_data into buffer 610 and through FIFO buffers 630 and 635 and multiplexer 640. A formatter 645 divides the 64-bit data according to the appropriate size for pixel values. For example, the exemplary embodiment of the invention supports 16-bit, 8-bit, and 4-bit pixel value formats so that one 64-bit data transfer provides four, eight, or sixteen separate pixel values. A serializer 650 transmits one pixel value at a time via signal PD[15:0].

Display state machine 670, multiplexer 64, formatter 645, and serializer 650 operate according to a pixel clock signal BGCLK from video encoder 130 to properly synchronize pixel values. Display state machine 670 uses vertical and horizontal synchronization signals BGVS and BGHS to synchronize DMA operations from a pixel map in local memory with video decoding. In response to the vertical synchronization signal BGVS, display state machine 670 begins transfer of data from the beginning of a pixel map; and in response to the horizontal synchronization signal BGHS, display state machine 670 begins transfer of data from the beginning of a row in the pixel map. In one embodiment of the invention, FIFO buffers 630 and 635 are large enough to hold a line of video data, and each DMA request is for a full line of video data. When signal BGHS is asserted, display state machine 670 switches from a FIFO 630 or 635 which was providing video data to a FIFO 635 or 630 which provides a new line of data.

Figure 7:
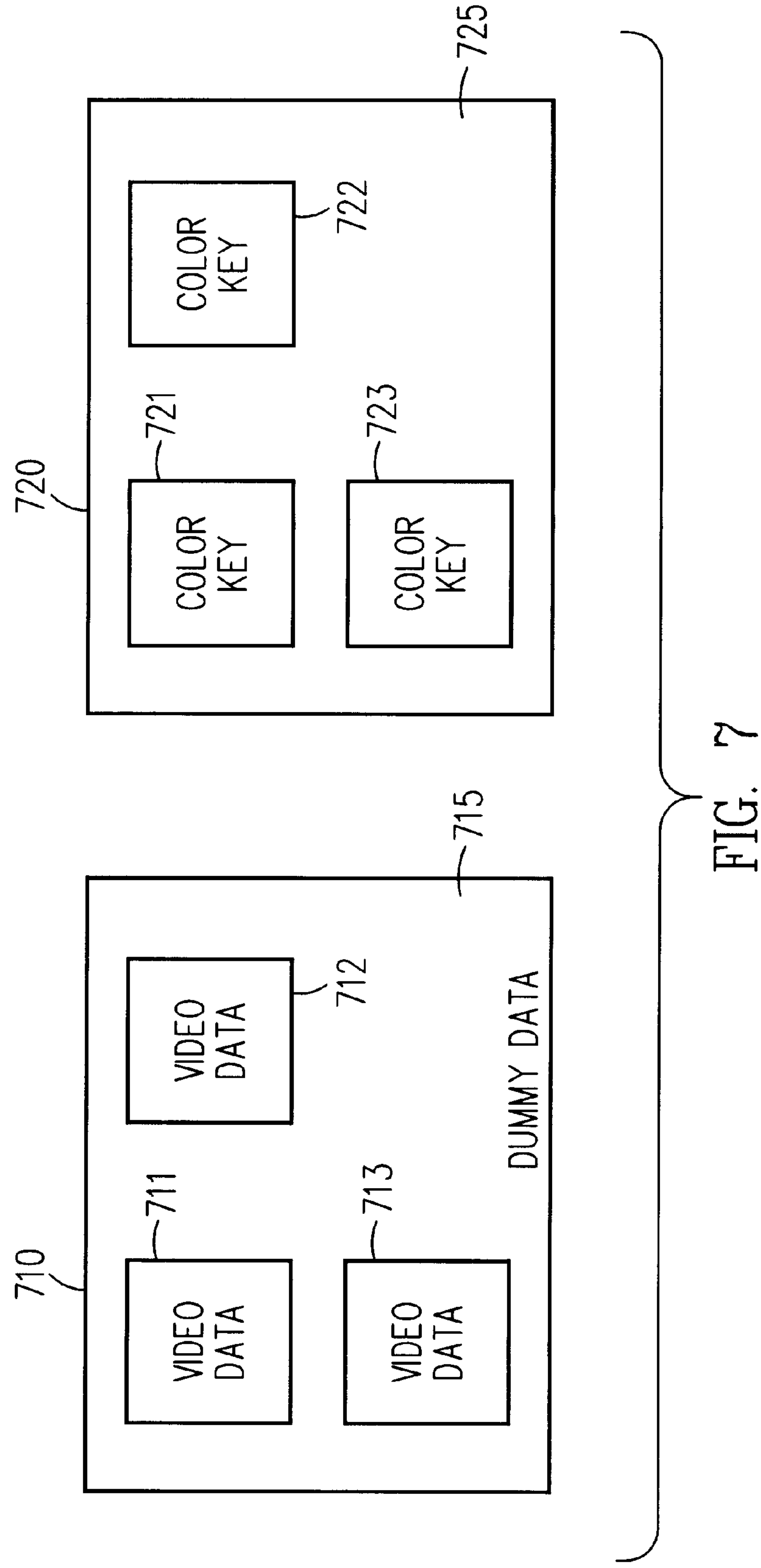
FIG. 7 illustrates graphics and video pixel maps generated in accordance with an embodiment of the invention.

FIG. 7 illustrates pixel maps used in an overlay processes in accordance with an embodiment of the invention. Pixel map 710 is a video pixel map generated by MSP 200 and stored in local memory 180. Pixel map 710 includes dummy data 715 and blocks of video data 711, 712, and 713. The value of the dummy data is unimportant since the dummy data value is unused. However, the dummy data acts as a place holder to define the locations of video data 711 to 713. Each block of video data represents a frame in a video image to be overlaid on a graphics image. Video data blocks 711, 712, and 713 can be from one or multiple sources including a video camera or television tuner which is coupled to video decoder 110, a communications signal which originated on a telephone line connected to DAA 170, or data supplied by the host CPU in a coded format such as JPEG, MPEG I, or MPEG II which MSP 200 decoded to generate pixel values. Graphics pixel map 720 represents the graphics image and contains video windows 721, 722, and 723 which are filled with a color key value. A single color key value can be used for all of the video windows since separate color keys are not required for distinguishing different video windows.

MSP 200 executes software to construct video pixel map 710 in a frame buffer in local memory 180. Two or more pixel map buffers may be employed so that MSP 200 can construct pixel maps for future video frames while a current pixel map is being used to generating a video signal. Before constructing pixel map 710, MSP 200 obtains the locations and sizes of video windows 721, 722, and 723 from a driver executed by the host CPU, and when constructing pixel map 710 fits video data blocks 711, 712, and 713 into the same shapes occupied by video windows 721, 722, and 723. Typically, each video window 711 to 713 is a rectangle, and the video data 711 to 713 have pixel values in rows and columns which match the size of the associated video window.

For the overlay process, processor 210 sets an HS, VS polarity register 501 so that video interface 252 recognizes assertion of vertical sync signal BGVS and horizontal sync signal BGHS. HS offset register 502 and VS offset register 503 are set to indicate an offset in clock cycles between assertion of signals BGVS and BGHS and the first required pixel value for a video frame or row in a video frame. A DMA transfer address in local memory 180 is set to the frame buffer corresponding to the next video frame which MSP 200 previously prepared. A bit DMAENA in logic control register 540 is then set to enable the start of DMA operations which load video data from the selected frame into FIFO buffers 630 and 635. Display state machine synchronizes the start of video transfer for the frame with the vertical synchronization signal BGVS and transfers one pixel value to video encoder 130 for each cycle of pixel clock BGCLK.

While MSP 200 is transferring pixel values to video encoder 130, video encoder 130 is also receiving pixel values through feature connector 120. When signal MSSEL indicates overlay mode operation, video encoder 130 selects and uses the pixel value from feature connector 120 unless that pixel value has the color key value. Video encoder 130 discards or ignores the pixel values from video interface 252, which should be dummy values, when decoding pixel values from the feature connector 120. If the pixel value from feature connector 120 has the color key value, video encoder 130 uses the pixel value from video interface 252. Since MSP 200 constructed video pixel map 710 to have the video data block 711 to 713 in the same locations as video windows 721 to 723 in graphics pixel map 720, video data replaces the color key values and video images are automatically displayed in the correct video window. While video encoder 130 generates the video signal for the current frame of a video, MSP 200 constructs in a second video buffer another pixel map for the next or a future video frame.

If signal MSSEL selects VGA emulation mode, video encoder 130 decodes only the pixel values from video interface 252. MSP 200 generates pixel maps as described above except that MSP 200 generates pixel values representing a graphics image in place of dummy data 715. Video interface 252 transfers the video data in the same manner as described above. According, device 100 of FIG. 1 could be used for an overlay process as describe above with a separate graphics card, or without a graphics card where MSP 200 implements the functions necessary to emulate a graphics card.

Although the invention has been described with reference to particular embodiments, the description is only an example of the invention's application and should not be taken as a limitation. Various adaptations and combinations of features of the embodiments disclosed are within the scope of the invention as defined by the following claims.

CROSS-REFERENCE TO RELATED APPLICATION

This patent document is related to and incorporates by reference the following:

U.S. patent application Ser. No. 08/697,102, entitled "MULTIPROCESSOR OPERATION IN A MULTIMEDIA SIGNAL PROCESSOR", filed Aug. 19, 1996;

U.S. patent application Ser. No. 08/699,597, entitled "SINGLE-INSTRUCTION-MULTIPLE-DATA PROCESSING IN A MULTIMEDIA SIGNAL PROCESSOR", filed Aug. 19, 1996;

co-filed U.S. patent application Ser. No. 08/733,813, entitled "RESIZABLE AND RELOCATABLE MEMORY SCRATCH PAD AS A CACHE SLICE";

co-filed U.S. patent application Ser. No. 08/733,913, entitled "PCI INTERFACE SYNCHRONIZATION";

co-filed U.S. patent application Ser. No. 08/730,864, entitled "SERIAL CODEC INTERFACE";

co-filed U.S. patent application Ser. No. 08/731,393, entitled "SHARED BUS SYSTEM WITH TRANSACTION AND DESTINATION ID"; and co-filed U.S. patent application Ser. No. 08/730,915, entitled "A PRIORITY REQUEST AND BYPASS BUS".

APPENDIX

This appendix describes an exemplary embodiment of ASIC interface 251. ASIC interface 251 contains a programmable 32-bits DMA controller 255 and codec interface blocks 330 to 337 and provides an interface between the main system bus (FBUS 250) which is running at 80 MHz and devices such as an AD1843 codec for audio telephone, a KS0122 video decoder for video capture, a KS0119 video encoder for overlay and VGA emulation. CODEC interfaces 330 to 337 and DMA controller 320 run at full FBUS speed to avoid synchronization problems.

ASIC interface 251 has three major sections: Fbus master/slave interface 310, 8-channel DMA controller 320, and codec interfaces 330 to 337. Data flows from FBUS 250 to external devices connected to codec interfaces 330 to 337 and visa versa. However, only DMA controller 320 generates an address for DMA operations. This address is then mapped in fbus interface logic 310. All writes from other FBUS nodes program the registers in the CODEC section.

ASIC interface 251 has the following features: 32-bits basic DMA function with 8 channels; two 4-deep×64-bit data FIFOs; one 1-deep×52-bit REQUEST FIFO; one 2-deep×52-bit REPLY FIFO; master/slave control for FBUS 250 and CODEC interface blocks at FBUS frequency of 80 MHz; internal arbitration for eight CODEC interfaces with the highest priority for KS0119 video encoder; IO to MEMORY and MEMORY to IO access; support for CODEC initialization; and a special address bus to achieve high performance for video encoder 130.

The codec interfaces support three different CODECs: an (AD1843) audio/communications codec 150 through a bidirectional 64-bit data bus that communicates with the DMA controller via channel 4 for DAC1, channel 5 for DAC2, channel 6 for ADC Left, and channel 7 for ADC Right; a (KS0122) video capture codec 110 through a bidirectional 64-bit data bus and is capable of initiating memory to IO and IO to memory requests to the DMA(Channel 2); a (KS0119) Video Backend codec 130 which receives data from the Memory Controller 258 directly.

DMA controller 255 has registers for address generation and translation and eight independent channels. Each channel has a current address register and a stop address register. A current address register is loaded whenever one of the eight CODEC's asserts a DMA request. When FBUS 250 grants bus access, the current address register increments each cycle until the current address register matches the stop address register. At that time, DMA controller 255 generates a signal "EOP" (End of process) which causes an interrupt.

DMA controller 255 supports IO to MEMORY, MEMORY to IO, and MEMORY to MEMORY access. Whenever a CODEC interface needs access to DMA control, the codec interface asserts a DMA_REQ signal and waits for DMA controller 255 to acknowledge "DACK". All eight DMA channels have a common arbitration unit which controls multiplexers and address comparison blocks. When acknowledged, the codec interface drives control signals and data. DMA controller 255 selects the appropriate channel depending on the DMA_ACK granted.

DMA controller 255 has a register set that processor 210 can access. In the exemplary embodiment, DMA controller 255 includes the following registers.

Each DMA channel has a 29-bit current address register (bits <31:3>) which requires all addresses to be 8-byte aligned. The current address register is a 29-bit counter which processor 210 can read. Processor 210 can load an initial value through FBUS 255 to the current address register. The current address value is incremented based on the data transfer size. The address in the current address register is sent to an address generation block to load the address on FBUS 250 through a multiplexer. The current address register holds the address value during idle state.

Each channel has a 29-bit stop address register (bits <31:3>) which requires all addresses to be 8-byte aligned. Processor 210 can write the Stop Address register through FBUS 250. A comparison block in DMA controller 255 compares the stop address values with current addresses. If a current address value matches an associated stop address value, DMA controller 255 generates a signal "EOP" for the associated channel.

The DMA status register indicates whether each channel has reached the stop address value. Bits <7:0> specify which channels have reached the stop address value and are reset if processor 210 initializes the current address register through CCU 230. Processor 210 can read but not write the DMA status.

The DMA control register contains control information for the operation of DMA controller 255. Bits <7:0> specify which DMA channel is enabled for operation and are reset whenever a corresponding channel reaches at a stop address. Processor 210 can set the DMA control register to restart operation. If any channel enable bit is "0", DMA controller 255 will not acknowledge (i.e. assert signal DMA_ACK to) a corresponding CODEC interface even if the CODEC interface sends signal DMA_REQ. Bits <19:16> of the DMA control register specify which pair of DMA channels are linked together to act as a double-buffer. For example, if channel 0 and channel 1 are linked together as a double-buffer, DMA controller 255 automatically switches to channel 1 when the current address of channel 0 reaches it's stop address and switches to channel 0 when the current address of channel 1 reaches it's stop address. Bits <28:21> contain information regarding a read/write mode for each channel. If processor 210 sets any bit of Bits <28:21> to "1", the corresponding channel is used for READ operation. Others channels are for WRITE operations. Bit <31> specifies whether DMA controller 255 sends signal EOP to interrupt controller 248. If bit <31> is "0", DMA controller 255 does not send signal EOP when a channel reaches the stop address.

Each bit in the control register has an associated mask bit in the mask register. A mask bit being "0" prevents updates of the corresponding bit in the control register. Initially, the mask register <31:0> is set to FFFF FFFFh.

Processor 210 programs the start and stop address through FBUS 250. FBUS 250 mapped values are as follows:

Cache Control Unit →0040_0000–007F_FFFF;

Memory Control unit →0080_0000–047F_FFFF;

PCI →0800_0000–FFFF_FFFF; and as shown in Table A.1.

TABLE A.1

DMA Register Address Map

| Address Offset <26:0> (hex) | # of Bits | Description |
|---|---|---|
| 4A0_0000 | 29 | Current Address Register 0 |
| 4A0_0008 | 29 | Current Address Register 1 |
| 4A0_0010 | 29 | Current Address Register 2 |
| 4A0_0018 | 29 | Current Address Register 3 |
| 4A0_0020 | 29 | Current Address Register 4 |
| 4A0_0028 | 29 | Current Address Register 5 |
| 4A0_0030 | 29 | Current Address Register 6 |
| 4A0_0038 | 29 | Current Address Register 7 |
| 4A0_0040 | | Reserved |
| 4A0_0048 | | Reserved |
| 4A0_0050 | 29 | Stop Address Register 0 |
| 4A0_0058 | 29 | Stop Address Register 1 |
| 4A0_0060 | 29 | Stop Address Register 2 |
| 4A0_0068 | 29 | Stop Address Register 3 |
| 4A0_0070 | 29 | Stop Address Register 4 |
| 4A0_0078 | 29 | Stop Address Register 5 |
| 4A0_0080 | 29 | Stop Address Register 6 |
| 4A0_0088 | 29 | Stop Address Register 7 |
| 4A0_0090 | | Reserved |

TABLE A.1-continued

DMA Register Address Map

| Address Offset <26:0> (hex) | # of Bits | Description |
|---|---|---|
| 4A0_0098 | | Reserved |
| 4A0_00A0 | 32 | Status Register |
| 4A0_00A8 | 32 | Control Register |
| 4A0_00B0 | 32 | Mask Register |

Processor 210 initializes the CODECs through ASIC interface 251. ASIC interface 251 has an address decoder to generate a request signal for each CODEC. Whenever ASIC interface 251 needs to access any CODEC, ASIC interface 251 sends a request signal CODEC_REQ to the codec interface and waits for an acknowledge signal CODEC_ACK from the codec interface. After receiving the acknowledge signal, ASIC interface 251 sends data and address to the codec interface.

When processor 210 wants to read configuration data in any codec interface, CCU 230 access ASIC interface 251 through FBUS 250 and provides an address and a transaction ID. ASIC interface 251 sends the address to the codec interface. ASIC interface 251 sends TRANSACTION ID and configuration data back to CCU 230 upon receiving the data from the CODEC. Table A.2 shows an address map for configuration registers in the codec interfaces.

TABLE A.2

CODEC Configuration Register Address Map

| Address <31:0> (hex) | Description |
|---|---|
| 04B0_0000 to 04BF_FFFF | CODEC0 Configuration Register |
| 04C0_1000 to 04C0_1FFF | CODEC1 Configuration Register |
| 04C0_2000 to 04C0_2FFF | CODEC2 Configuration Register |
| 04C0_3000 to 04C0_3FFF | CODEC3 Configuration Register |
| 04C0_4000 to 04C0_4FFF | CODEC4 Configuration Register |
| 04C0_5000 to 04C0_5FFF | CODEC5 Configuration Register |
| 04C0_6000 to 04C0_6FFF | CODEC6 Configuration Register |
| 04C0_7000 to 04C0_7FFF | CODEC7 Configuratioh Register |
| 04C0_8000 to 04C0_8FFF | Reserved |
| 04C0_9000 to 04C0_9FFF | Reserved |

TABLE A.3

I/O Signals for the ASIC interface

| Signal Name | Dir | Description |
|---|---|---|
| clk1 | in | 80 MHZ system clock input |
| f_reset_1 | in | Fbus reset-signal (Low active) |
| Fasc_grant_1 | in | Fbus grant from Fbus Arbiter for ASIC unit(Low active) |
| Fasc_cs_1 | in | ASIC chip select signal (Low active) |
| C0_size[7:0]– C9_size[7:0] | in | CODEC data transfer size: 8'h08 => 8 bytes, 8'h20 => 32 bytes, 8'h18 => 24 bytes, 8'h20 => 32 bytes |
| DMA_REQ0– DMA_REQ7 | in | DMA request signals come from CODECs |
| CODEC_ACK0– CODEC_ACK7 | in | CODEC acknowledge signals come from CODECs |
| ref._full | in | FIFO used for screen refresh full signal (comes from the MCU) |
| Fdrdy_1 | in/ out | Fbus data ready signal, valid one cycle before actual data. |
| Fdata[63:0] | in/ out | Fbus data |
| Faddr[31:0] | in/ out | Fbus address |
| Freq_ID[9:0] | in/ out | Fbus request ID: [9:6] => requester ID, [5:0] => Transaction ID |
| Freq_size[7:0] | in/ out | Fbus data transfer size |
| Frd_wr_1 | in/ out | Read/Write indication: "1" => read, "0" => write |
| Fpr_wr_1 | in/ out | Partial write indication (Low active) |
| C0_DATA[63:0]– C9_DATA[63:0] | in/ out | CODEC data |
| Fasc_dfull | out | ASIC unit data FIFO full.(goes to Fbus arbiter) |
| Fasc_afull | out | ASIC unit reply FIFO full(goes to Fbus arbiter) |
| Fasc_grCNT [1:0] | out | Fbus grant counter which is valid with request to indicate the number of cycles grant is needed for(goes to Fbus arbiter) |
| Fasc_did[2:0] | out | Fbus destination ID to request from ASIC unit |
| Fasc_recl_1 | out | Fbus request signal from ASIC unit(Low active) |
| CODEC ADDR[31:0] | out | CODEC address which are only used for codec configuration register read/write(goes to CODECs) |
| DMA_ACK0– DMA_ACK7 | out | DMA acknowledge signals(goes to CODECs) |
| Crd_wr_1 | out | Read/Write indication for codec configuration register access. |
| CODEC_REQ0– CODEC_REQ7 | out | CODEC request signals |
| EOP | out | End of Process. This signal goes to interrupt controller. |
| Ref_addr[31:0] | out | Address for CHANNEL0(goes to the MCU) |
| addr_valid | out | Channel0 address valid signal(goes to the MCU) |
| Fmem_grant_1 | in | MCU grant signal comes from FBUS arbiter |

Video interface 252 includes a control interface for access to all registers inside the KS0119 and the KS0122 codecs. A three wire serial interface module supports the communication protocol for the registers of the KS0119 and KS0122. Video interface 252 also includes an interface to an external EPROM which is used to load in program data immediately after system reset, and is part of the boot initialization. The EPROM is memory mapped, with address ranges from C0000h to DFFFFh.

Video encoder interface 410 in video interface 252 has a base address CODEC_REQ0 equal to 04B0 0000h and extends to 04BF FFFFh. Table A.4 describes the registers of the video encoder interface.

TABLE A.4

Video Encoder Register Address Map

| Offset (hex) | Register Name |
|---|---|
| 0 | Frame size Register |
| 1 | ID |
| 2 | Control/DATA Byte |
| 3 | INDEX/DATA0 |
| 4 | DATA1 |
| 5 | DATA2 |
| 6 | DATA3 |
| 7 | Status Register |
| 8 | Read DATA Serial Interface |
| 9 | Read PROM Data |
| A | Logic Control Register |
| B | HS, VS polarity |
| C | HS offset |
| D | VS offset |

Information from some or all of an ID register, a control register, an index/DATA0 register, DATA1 register, DATA2 register, and DATA3 register are sequentially sent to video encoder 130 to access registers of video encoder 130. The frame size register controls the frame size (i.e. which register's contents) are transmitted to video encoder 130. Frame sizes range from three (the ID register, the control register, and the index/DATA0 register) to six bytes (the ID, control, index/DATA0, DATA1, DATA2, and DATA3 registers.) The chip ID Register contains the CODEC chip ID value and should contain 03H for writes to the KS0199 codec and 83H for a read. The control/data register indicates whether the following transmitted byte is an index or a data byte. For the KS0119, 08h means that the following byte is an index, and 09h means that the following byte is data. INDEX/DATA0 register contains the index value for the configuration register in video encoder 130 or the data byte DATA0, depending on the value transmitted in the previous byte from the control data register. DATA1, DATA2, and DATA3 registers contain data to be written in the CODEC register, Index+1, Index+2, and Index+3 respectively.

The logic control register for the video encoder interface contains the number of bits per pixel value, a mode bit indicating whether video encoder operates in overlay mode or video card emulation mode, and a bit DMAENA to enable or disable DMA channel 0.

The HS and VS Polarity register defines the polarity of horizontal sync and vertical sync signal. A value of 0 is defined to be active low, and a value of 1 is defined to be active high. Bit <0> indicates vertical sync polarity. Bit <1> indicates horizontal sync polarity. The HS offset register indicates the offset to the active horizontal sync signal and is defined to be 00h. The VS offset register indicates the offset to the active vertical sync signal and is defined to be 00h.

The status register contains a read flag indicating whether a read of the external codec is ready or busy, a write flag indicating whether a write to the external codec is ready or busy, and a PROM flag indicating whether a read of the external PROM is ready or busy. The read data serial interface register contains the valid data from the serial port after the read flag transitions from busy to ready state. The Read PROM Data register contains the valid PROM data if the PROM Flag is in the ready state.

Video encoder 130 can be configured to operate in overlay mode or VGA emulation Mode. Setting of a bit in logic control register 504 controls the mode. In the overlay mode, a VGA card in the host system is required, but the monitor cable connects to the MSP card. MSP 200 creates multiple display buffers each the same size as the VGA settings. To create a video window, software should fill a color key area in the VGA frame buffer of the host system, and the video data in SDRAM 180 should be written into an area of the same size and at the same location as the area in the VGA Frame Buffer. Video encoder 130 recognizes the color key and switches from the VGA input port coupled to feature connector 120 to the video input port coupled to video interface 252. Software executed by MSP 200 sets the starting address for DMA channel 0 at the top left corner of an SDRAM video Output Buffer, the DMA record length is set according to the resolution set in the VGA card and the bits used per pixel in the video data (16 bit per pixel for YCrCb 4:2:2).

Setting configuration registers in a KS0119 video encoder requires a minimum of two frames: a first frame to set the index of the configuration register; and a second frame for read or write the content of the register. All bytes required for the frame are set before changing the frame size register. The following example is for the setting chroma key byte 0 and byte 1 of a KS0119 configuration register (index 6Ah and 6Bh). ID register 507 is loaded with the value 03h for write to video encoder 130. Data/control register 508 is loaded with value 08h to indicate that the next byte is an index. Index/data register 509 is loaded with value 6Ah (the index of the first register to be accessed). Finally, the frame size register is loaded with the value 83h (Frame size=3 and serial access bit set). Serial interface state machine 570 detects a match with the content of the frame size register and start sending the frame, also the write flag in the status register is set to the busy state. Software should check the flags in the status register before loading the next frame. When the flags are in the ready state then software can load control register 508 to indicate a data write, index/data0 register 509 and DATA1 register 510 with the chroma key bytes, and frame size register 506 with 84h for a four byte frame.

Video decoder interface 420 has a base address equal to 04C0 2000h and extends to 04C0 2FFFh. Table A.5 defines the register of video decoder interface 420.

TABLE A.5

Video Decoder Interface Registers

| Offset (hex) | Register Name |
|---|---|
| 0 | Frame Size Register |
| 1 | ID |
| 2 | Control/DATA Byte |
| 3 | INDEX/DATA0 |
| 4 | DATA1 |
| 5 | DATA2 |
| 6 | DATA3 |
| 7 | Reserved |
| 8 | Read DATA Serial Interface |
| 9 | Reserved |
| A | Logic Control Register |
| B | Reserved |
| C | Reserved |
| D | Reserved |
| E | Status Register |

The frame size register, ID register, control register, index/data0 register, data1 register, data2 register, and data3 register operate as described above in regard to video encoder interface 410. However, when accessing video decoder 110, ID register contain 04h for KS0122 write and 84h for KS0122 read, and the control/data register being 00h means the following byte is an index and 10h means that the following byte is data.

The logic control register 505 indicates the pixel value format as follow: 00 4:2:2 format; 01 4:1:1 format; and 10 CCIR656 format. Status register bit <0> is 0 to indicate and even field and 1 to indicate an odd field for the pixel values being transmitted. Status register bit <1> indicates VS Status: 0: VS from 1 to 0; and 1: VS from 0 to 1.

The read data serial interface register contains the valid data from the serial port after the Read Flag has made the transition from Busy to Ready State.

We claim:

1. A video overlay process comprising:

forming a first set of pixel values which represents a frame in a graphics image, wherein within the frame, one or more areas are represented by pixel values that have a key value;

forming a second set of pixel values, wherein pixel values in the second set are in one-to-one correspondence with pixel values in the first set; and generating a video signal from the pixel values, wherein generating the video signal comprises:

encoding pixel values from the first set except the pixel values in the first set that have the key value; and encoding pixel values from the second set in place of the pixel values in the first set that have the key value.

2. The process of claim 1, wherein the pixel values in the first set that have the key value represent a plurality of rectangular areas in the graphics image, and the pixel values in the second set that correspond to the pixel values having the key value represent a plurality of video images, wherein the plurality of video images are in one-to-one correspondence with the plurality of rectangular areas.

3. The process of claim 1, wherein a device connected to a bus of a host computer forms the second set of pixel values, and the process comprises the host computer transmitting to the device, information indicating which pixel values in the first set are equal to the key value.

4. The process of claim 3, wherein forming the second set of pixel values comprises forming a pixel map in a local memory of the device such that one or more blocks of pixel values which represent one or more video images are position in the pixel map at locations corresponding to the areas in the graphics image represented by pixel values having the key value.

5. The process of claim 4, wherein forming the second set of pixel values comprises providing dummy values for pixel values in the second set which do not correspond to pixel values in the first set that have the key value.

6. The process of claim 1, wherein encoding pixel values comprises:

simultaneously transmitting to a video encoder a first pixel value from the first set and a second pixel value which is from the second set and corresponds to the first pixel value, wherein the video encoder performs steps including:

determining whether the first pixel value has the key value;

generating the video signal based on the first pixel value in response to determining the first pixel value does not have the key value; and generating the video signal based on the second pixel value in response to determining the first pixel value has the key value.

7. The process of claim 1, wherein generating the video signal further comprises:

sequentially transmitting the pixel values from the first set to a video encoder;

sequentially transmitting the pixel values from the second set to the video encoder, wherein each pixel value in the second set is transmitted to the video encoder simultaneously with the corresponding value in the first set;

for each pixel value in the first set, determining whether that pixel value has the key value;

generating the video signal based on the pixel value from the first set in response to determining the pixel value does not have the key value; and generating the video signal based on the pixel value from the second set in response to determining the corresponding pixel value from the first set has the key value.

8. A video overlay system comprising:

a video encoder capable of alternative selecting a first input value and a second input value for generation of a video signal, wherein the first input value is selected unless the first input value has a key value;

a source of pixel values representing a graphics image, wherein the source provides pixel values to the video encoder as the first input value;

a buffer for a frame having dimensions corresponding to dimensions of the graphics image; and a video interface coupled to the buffer and the video encoder, wherein video interface transfers pixel values from the buffer to the video encoder as the second input value, wherein the source and the video interface are synchronized so that the video interface provides the pixel values from the buffer in a one-to-one correspondence with the pixel values from the source of video data.

9. The overlay system of claim 8, wherein the video interface is coupled to receive a vertical synchronization signal from the video encoder, and the video interface begins transferring pixel values from the buffer in response to the vertical synchronization signal.

10. The overlay system of claim 9, wherein the video interface is coupled to receive a horizontal synchronization signal from the video encoder, and the video interface begins transferring pixel values from a start of a row in the buffer in response to the horizontal synchronization signal.

11. The overlay system of claim 8, further comprising:

a signal processor which generates the pixel values stored in the buffer; and a direct memory access control which controls transfers of pixel values from the buffer to the video interface.

* * * * *